US012128835B2

(12) United States Patent
Nishimura et al.

(10) Patent No.: US 12,128,835 B2
(45) Date of Patent: Oct. 29, 2024

(54) WIRING MEMBER WITH ROUTE BENDING

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Motohiro Yokoi, Mie (JP); Kenta Ito, Mie (JP); Hidetoshi Ishida, Mie (JP); Ryusuke Kudo, Mie (JP); Masaki Mizushita, Mie (JP); Haruka Nakano, Mie (JP); Kenta Arai, Mie (JP); Daisuke Ebata, Mie (JP)

(73) Assignees: AutoNetworks Technologies, Ltd., Mie (JP); Sumitomo Wiring Systems, Ltd., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 162 days.

(21) Appl. No.: 17/785,355

(22) PCT Filed: Dec. 8, 2020

(86) PCT No.: PCT/JP2020/045646
§ 371 (c)(1),
(2) Date: Jun. 14, 2022

(87) PCT Pub. No.: WO2021/124984
PCT Pub. Date: Jun. 24, 2021

(65) Prior Publication Data
US 2022/0388462 A1    Dec. 8, 2022

(30) Foreign Application Priority Data

Dec. 20, 2019    (JP) .................................. 2019-230696

(51) Int. Cl.
*B60R 16/02* (2006.01)
*H01B 7/00* (2006.01)
*H02G 3/04* (2006.01)

(52) U.S. Cl.
CPC ....... *B60R 16/0215* (2013.01); *H01B 7/0045* (2013.01); *H02G 3/04* (2013.01)

(58) Field of Classification Search
None
See application file for complete search history.

(56) References Cited

U.S. PATENT DOCUMENTS 3,911,201 A * 10/1975 Fry ...................... H01B 7/0045
                                                        174/72 A
9,672,959 B2 * 6/2017 Sakaki ................ B60R 16/0207
(Continued)

FOREIGN PATENT DOCUMENTS

CN      1490827     4/2004
CN    101288348    10/2008
(Continued)

OTHER PUBLICATIONS

FR2886469_Translated_and_Original (Year: 2006).*
(Continued)

*Primary Examiner* — Binh B Tran
*Assistant Examiner* — Muhammed Azam
(74) *Attorney, Agent, or Firm* — Greenblum & Bernstein, P.L.C.

(57) ABSTRACT

A wiring member includes: at least one wire-like transmission member; and a sheet to which the wire-like transmission member is fixed, wherein a route bending portion in which the wire-like transmission member is bended and disposed is provided on the sheet, and the route bending portion includes a bending position.

6 Claims, 6 Drawing Sheets

(56) References Cited

U.S. PATENT DOCUMENTS

| | | | |
|---|---|---|---|
| 9,713,991 B2* | 7/2017 | Katou | B60R 16/0215 |
| 10,819,094 B2* | 10/2020 | Mizuno | H02G 3/0418 |
| 2003/0029703 A1* | 2/2003 | Miyako | B60R 16/0215 |
| | | | 200/61.54 |
| 2003/0081394 A1* | 5/2003 | Enomoto | H05K 3/326 |
| | | | 361/777 |
| 2003/0221858 A1* | 12/2003 | James | B60R 16/0215 |
| | | | 174/93 |
| 2006/0076158 A1 | 4/2006 | Umeyama et al. | |
| 2008/0259576 A1* | 10/2008 | Johnson | H05K 1/028 |
| | | | 361/749 |
| 2008/0271913 A1* | 11/2008 | Enomoto | H05K 1/0281 |
| | | | 174/254 |
| 2009/0009977 A1* | 1/2009 | Enomoto | H05K 1/189 |
| | | | 361/749 |
| 2013/0000941 A1* | 1/2013 | Taniguchi | B60R 16/027 |
| | | | 174/68.3 |
| 2013/0161092 A1* | 6/2013 | Kurita | B60R 16/0215 |
| | | | 174/72 A |
| 2014/0204544 A1* | 7/2014 | Tanaka | H05K 1/118 |
| | | | 361/752 |
| 2014/0291016 A1* | 10/2014 | Kajiwara | H01B 9/00 |
| | | | 174/70 R |
| 2014/0305697 A1* | 10/2014 | Hudson | H02G 3/30 |
| | | | 174/72 A |
| 2014/0360771 A1* | 12/2014 | Itani | H02G 3/0481 |
| | | | 174/354 |
| 2016/0019998 A1* | 1/2016 | Kawaguchi | H02G 3/0487 |
| | | | 174/72 A |
| 2016/0055938 A1* | 2/2016 | Hamabayashi | H01B 13/01263 |
| | | | 174/72 A |
| 2016/0264073 A1* | 9/2016 | Katou | B60R 16/0215 |
| 2016/0280157 A1* | 9/2016 | Katou | B60N 2/02 |
| 2016/0322797 A1* | 11/2016 | Kimoto | H02G 3/04 |
| 2016/0368436 A1* | 12/2016 | Wakabayashi | B60R 16/0215 |
| 2017/0162293 A1* | 6/2017 | Wakabayashi | H01B 3/30 |
| 2017/0264064 A1* | 9/2017 | Matsui | B60R 16/0207 |
| 2018/0056896 A1* | 3/2018 | Okamoto | B60R 16/0215 |
| 2019/0036311 A1* | 1/2019 | Mizuno | H02G 3/0418 |
| 2019/0248309 A1* | 8/2019 | Hida | H02G 3/22 |
| 2019/0252092 A1* | 8/2019 | Mizuno | B60R 16/0215 |
| 2019/0392963 A1* | 12/2019 | Ishida | H01B 7/0045 |
| 2020/0027628 A1* | 1/2020 | Ikeda | H02G 3/0462 |
| 2021/0024020 A1 | 1/2021 | Nishimura et al. | |
| 2021/0035712 A1* | 2/2021 | Mizuno | B60R 16/0215 |

FOREIGN PATENT DOCUMENTS

| | | | | |
|---|---|---|---|---|
| CN | 202094452 U | * | 12/2011 | |
| CN | 102396039 A | * | 3/2012 | H01B 11/203 |
| CN | 202796144 U | | 3/2013 | |
| CN | 202917198 U | | 5/2013 | |
| CN | 203157898 U | * | 8/2013 | |
| CN | 203166276 U | * | 8/2013 | |
| CN | 203172566 U | * | 9/2013 | |
| CN | 105155081 A | * | 12/2015 | G02B 6/4459 |
| CN | 207818257 U | | 9/2018 | |
| JP | S6282607 A | * | 4/1987 | |
| JP | 63-201366 | | 12/1988 | |
| JP | 2-21771 | | 2/1990 | |
| JP | 5-258547 | | 10/1993 | |
| JP | H0650167 U | * | 7/1994 | |
| JP | H076632 A | * | 1/1995 | |
| JP | 08-045356 | | 2/1996 | |
| JP | 9-223415 | | 8/1997 | |
| JP | 2000207960 A | * | 7/2000 | |
| JP | 2001223046 A | * | 8/2001 | |
| JP | 2002514151 A | * | 5/2002 | |
| JP | 2003168327 A | * | 6/2003 | B60R 16/0207 |
| JP | 2004039543 A | * | 2/2004 | G11B 5/486 |
| JP | 2005-310675 | | 11/2005 | |
| JP | 2006-140452 | | 6/2006 | |
| JP | 2006-253294 | | 9/2006 | |
| JP | 2009-512209 | | 3/2009 | |
| JP | 2010-129904 | | 6/2010 | |
| JP | 2012-84590 | | 4/2012 | |
| JP | 2017-123421 | | 7/2017 | |
| JP | 2018-137208 | | 8/2018 | |
| JP | 2019-175579 | | 10/2019 | |
| JP | 2019-204742 | | 11/2019 | |
| JP | 2019-205349 | | 11/2019 | |
| JP | 2019213378 A | * | 12/2019 | B60R 16/0215 |
| JP | 2020087559 A | * | 6/2020 | |
| KR | 20170080750 A | * | 7/2017 | |
| WO | WO-0207279 A1 | * | 1/2002 | G02B 6/4459 |
| WO | WO-2012164771 A1 | * | 12/2012 | B60R 16/0215 |
| WO | WO-2014077012 A1 | * | 5/2014 | H02G 3/30 |
| WO | WO-2015001921 A1 | * | 1/2015 | B60R 16/0215 |
| WO | WO-2015115164 A1 | * | 8/2015 | B60R 16/0215 |
| WO | WO-2015129429 A1 | * | 9/2015 | B60R 16/0215 |
| WO | WO-2015151987 A1 | * | 10/2015 | B60R 16/0215 |
| WO | WO-2016067877 A1 | * | 5/2016 | B60R 16/02 |
| WO | WO-2016080522 A1 | * | 5/2016 | H01B 5/02 |
| WO | WO-2016158455 A1 | * | 10/2016 | |
| WO | WO-2017082006 A1 | * | 5/2017 | B60R 16/02 |

OTHER PUBLICATIONS

WO2019181141_Translated_and_Original (Year: 2019).*
WO2020241221_Translated_and_Orignial (Year: 2020).*
China Office Action issued in China Patent Application No. 202080086961.2, dated Oct. 13, 2023, together with English translation thereof.
International Search Report issued in International Patent Application No. PCT/JP2020/045646, dated Feb. 16, 2021, along with an English translation thereof.
Japan Office Action issued in Japan Patent Application No. 2019-230696, dated Jan. 31, 2023, together with English translation thereof.

* cited by examiner

WIRING MEMBER WITH ROUTE BENDING

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Documents

Patent Document 1: Japanese Application Laid-Open No. 2018-137208

SUMMARY

Problem to be Solved by the Invention

A wire harness described in Patent Document 1 is bended at a time of transportation, for example, in some cases. Strong force on an electrical wire is desired to be suppressed at a time of bending the wire harness.

Accordingly, an object is to provide a technique of suppressing strong force on a wire-like transmission member at a time of bending a wiring member.

Means to Solve the Problem

A wiring member according to the present disclosure is a wiring member including: at least one wire-like transmission member; and a sheet to which the wire-like transmission member is fixed, wherein a route bending portion in which the wire-like transmission member is bended and disposed is provided on the sheet, and the route bending portion includes a bending position.

Effects of the Invention

According to the present disclosure, suppressed is strong force on a wire-like transmission member at a time of bending a wiring member.

DESCRIPTION OF EMBODIMENT(S)

[Description of Embodiment of Present Disclosure]

Embodiments of the present disclosure are listed and described firstly.

A wiring member according to the present disclosure is as follows.

(1) A wiring member includes: at least one wire-like transmission member; and a sheet to which the wire-like transmission member is fixed, wherein a route bending portion in which the wire-like transmission member is bended and disposed is provided on the sheet, and the route bending portion includes a bending position. The route bending portion in the wiring member is bended, thus strong force on a wire-like transmission member is suppressed. A plurality of actions are considered as this action, and first and second actions described hereinafter are considered as examples. Firstly, when the route bending portion the wiring member is bended, a region to which force is applied at the time of bending is increased in a circumferential direction of the wire-like transmission member. Accordingly, force is diffused, and strong force is hardly applied. Secondly, compression occurs in a portion on an inner side of the wire-like transmission member at a time of bending, and extension occurs in a portion on an outer side. When a ratio of a route difference is large, strong force is considered to be easily applied to the wire-like transmission member. When the route bending portion is bended, a route difference between a route of a compressed portion and a route of an extended portion is small in ratio compared with a case where a portion of the wiring member where the wire-like transmission member is linearly disposed is bended, and strong force is hardly applied to the wire-like transmission member.

(2) It is also applicable that the route bending portion includes a same route bending portion in which the plurality of wire-like transmission members in the route bending portion extend along an identical route, and the same route bending portion includes a bending position. Accordingly, the wiring member is bended at the same route bending portion.

(3) It is also applicable that the route bending portion includes a branch route bending portion in which some of the plurality of wire-like transmission members are branched from another some of the plurality of wire-like transmission members, and the branch route bending portion includes a bending position. Accordingly, the wiring member is bended at the branch route bending portion.

(4) It is also applicable that the wire-like transmission member is fixed to the sheet at a plurality of fixing positions at intervals along a longitudinal direction in the route bending portion, and the bending position is formed between the plurality of fixing positions. A portion between the fixing positions in the wire-like transmission can be moved relatively freely compared with a portion fixed to the sheet. Accordingly, stress is easily diffused at a time of bending the wiring member, and strong force on the wire-like transmission member is suppressed.

(5) The bending position may be formed in a portion where the wire-like transmission member is fixed to the sheet. Accordingly, the wire-like transmission member is hardly separated from the sheet at the time of bending the wiring member. Accordingly, an operation of bending the wiring member is easily performed.

(6) It is also applicable that the wire-like transmission member is fixed to the sheet at a plurality of fixing positions at intervals along a longitudinal direction, and one of the plurality of fixing positions is located, in a portion where the bending position is formed. Accordingly, the bending position is disposed in one of the plurality of fixing positions.

(7) A fold line which can be recognized from the bending position may extend in a direction perpendicular to a tangential direction of the wire-like transmission member in the route bending portion. Accordingly, fixation of the sheet and the wire-like transmission member is hardly resolved.

(8) A fold line which can be recognized from the bending position may extend in a direction intersecting with a tangential direction of the wire-like transmission member in the route bending portion at an angle other than a right angle. Accordingly, a region for bending in the wire-like transmission member is increased, and strong force is hardly applied to the wire-like transmission member.

(9) A wiring member according to the present disclosure is a wiring member including: at least one wire-like transmission member; and a sheet to which the wire-like transmission member is fixed, wherein a route bending portion in which the wire-like transmission member is bended and disposed on the sheet, and the route bending portion is folded. The route bending portion in the wiring member is folded, thus strong force on the wire-like transmission member is suppressed. A plurality of actions are considered as this action, and first and second actions described hereinafter are considered as examples. Firstly, when the route bending portion in the wiring member is folded, a region to which force is applied at the time of bending is increased in a circumferential direction of the wire-like transmission member. Accordingly, three is diffused, and strong force is hardly applied. Secondly, compression occurs in a portion on an inner side of the wire-like transmission member at a time of folding, and extension occurs in a portion on an outer side. When a ratio of this route difference is large, strong force is considered to be easily applied. When the route bending portion is folded, a route difference between a route of a compressed portion and a route of an extended portion is small in ratio compared with a case where a portion of the wiring member where the wire-like transmission member is linearly disposed is folded, and strong force is hardly applied to the wire-like transmission member.

DETAILS OF EMBODIMENT OF PRESENT DISCLOSURE

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 1:
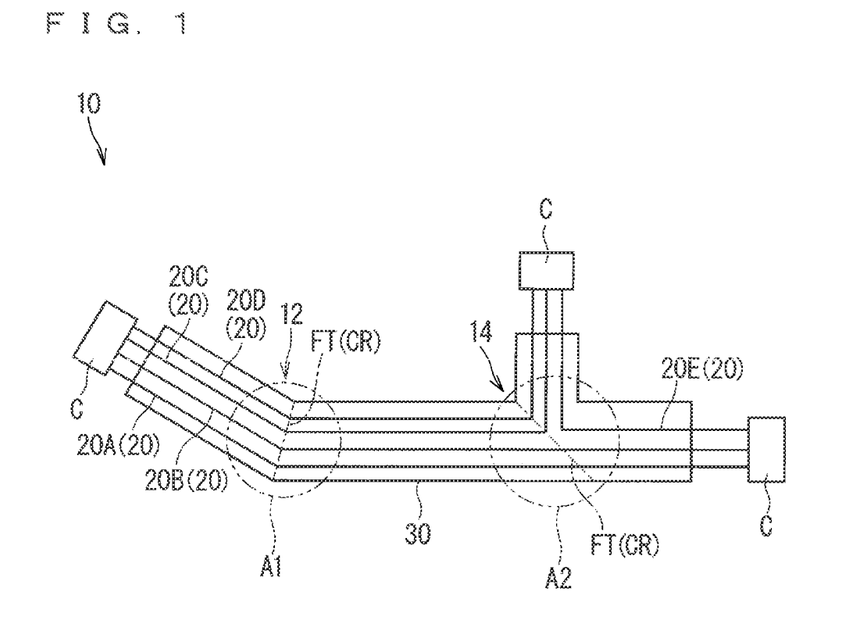
FIG. 1 is a schematic plan view illustrating a wiring member according to an embodiment 1.
Figure 2:
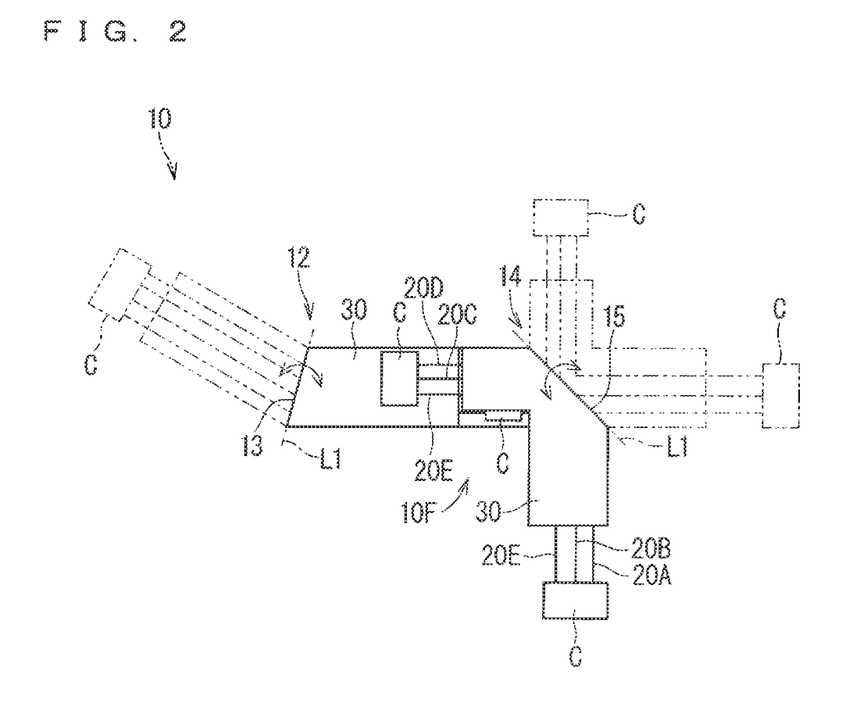
FIG. 2 is a schematic plan view illustrating a bended wiring member.

A wiring member according to an embodiment 1 is described hereinafter. FIG. 1 is a schematic plan view illustrating a wiring member 10 according to the embodiment 1. FIG. 2 is a schematic plan view illustrating the bended wiring member 10. When the wiring member 10 in a folded state as illustrated in FIG. 2 needs to be distinguished from the wiring member 10 in a developed state as illustrated in FIG. 1, a sign F is assigned to the wiring member 10 to be referred to as the wiring member 10F in some cases.

The wiring member 10 includes a wire-like transmission member 20 and a sheet 30. The wire-like transmission member 20 is fixed to the sheet 30. The wiring member 10 is mounted to a vehicle, for example. The wiring member 10 is disposed in an arrangement target in a vehicle. The arrangement target is, for example, a body frame, a body panel, and an interior panel in a vehicle. The arrangement target includes an arrangement surface. For example, the wiring member 10 is disposed in the arrangement target while the sheet 30 extends on the arrangement surface. A portion of the wire-like transmission member 20 fixed to the sheet 30 is kept in an extended state along an arrangement route. Accordingly, the wiring member 10 is simply disposed in the arrangement target.

At least one wire-like transmission member 20 is included. Herein, the plurality of wire-like transmission members 20 are included. Each wire-like transmission member 20 is a wire-like member transmitting electrical power or light. The sheet 30 is formed into a flat shape as a whole. The plurality of wire-like transmission members 20 are fixed to the sheet 30, thus the wiring member 10 is kept in a flat state. The plurality of wire-like transmission members 20 having the same diameter and structure may be disposed in one sheet 30. Diameters and structures, for example, of the plurality of wire-like transmission members 20 may be appropriately set, and the wire-like transmission members 20 having different diameters and structures may be disposed in the same sheet 30.

The plurality of wire-like transmission members 20 are assumed to be members connecting components in a vehicle. A connector C, for example, is provided on an end portion of the wire-like transmission member 20. This connector C is connected to a connector provided in the other side component, thus the wire-like transmission member 20 is connected to the other side component. That is to say, the present wiring member 10 is used as the wiring member 10 electrically connecting various types of component in a vehicle, for example (or connecting them so that they can perform optical communication). The connector C may be fixed to the sheet 30.

Routes of the plurality of wire-like transmission members 20 are set in accordance with a position of a component to which the wire-like transmission members 20 are connected. The plurality of wire-like transmission members 20 are fixed to the sheet 30, thus the plurality of wire-like transmission members 20 are kept in a form following a wiring route corresponding to a position of a component as a connection destination of each wire-like transmission member 20. The plurality of wire-like transmission members 20 may be fixed to the sheet 30 in a state where a branch wire is branched from a main wire. The sheet 30 may also be formed into a shape in which a portion to which the branch wire is fixed is branched from a portion to which the main wire is fixed. Herein, the plurality of wire-like transmission members 20 are branched on the sheet 30.

The wire-like transmission member 20 includes a transmission wire body and a covering layer, for example. The transmission wire body transmits an electrical power or light, for example. The covering layer covers the transmission wire body. For example, the wire-like transmission member 20 may be a general wire having a core wire and a covering layer around the core wire, or may also be a shielded wire, a twisted wire, an enamel wire, a nichrome wire, or an optical fiber. The wire-like transmission member 20 may be an electrical wire such as a bare wire which does not include the covering layer.

The wire-like transmission member 20 transmitting the electrical power may be various kinds of signal lines or various kinds of power lines. Some of the wire-like transmission members 20 transmitting the electrical power may be used as an antenna or coil, for example, transmitting or receiving a signal or electrical power to or from a space.

The wire-like transmission member 20 may be a single wire-like object or a composite object of a plurality of wire-like objects (a twisted wire and a cable made up of a plurality of wire-like objects covered by a sheath).

The wire-like transmission member 20 is fixed to one main surface of the sheet 30. A fixing structure of the wire-like transmission member 20 fixed to the sheet 30 is not particularly limited as long as the wire-like transmission member 20 is fixed to the sheet 30. Applicable as the fixing state are a contact area fixation and a non-contact area fixation, or both fixations may be used together. Herein, the contact area fixation indicates that a portion where the wire-like transmission member 20 and the sheet 30 have contact with each other is stuck and fixed. The non-contact area fixation is a fixing state which is not the contact area fixation, and indicates that a sewing thread, a cover, or an adhesive tape presses the wire-like transmission member 20 toward the sheet 30 or sandwiches the wire-like transmission member 20 and the sheet 30 to keep them in a fixing state. In the description hereinafter, the wire-like transmission member 20 and the sheet 30 are in the state of the contact area fixation.

Applicable as the configuration of the contact area fixation are a contact area indirect fixation and a contact area direct fixation, or both fixations may also be used together in different regions. Herein, the contact area indirect fixation indicates that the wire-like transmission member 20 and the sheet 30 are indirectly stuck and fixed via an adhesive agent, a gluing agent, and a double-sided adhesive tape provided therebetween. The contact area direct fixation indicates that the wire-like transmission member 20 and the sheet 30 are directly stuck and fixed without an intervention of the adhesive agent, for example, which is separately provided. Considered in the contact area direct fixation is that resin included in at least one of the wire-like transmission member 20 and the sheet 30 is melted, thus the wire-like transmission member 20 and the sheet 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the wire-like transmission member 20 and the sheet 30 are in the state of the contact area direct fixation by these means. Specifically, when the state of the contact area direct fixation is formed by the ultrasonic welding, for example, the wire-like transmission member 20 and the sheet 30 are in the state of the contact area direct fixation by the ultrasonic welding.

In the description hereinafter, the wire-like transmission member 20 and the sheet 30 are in the state of the contact area direct fixation.

The sheet 30 may have a single layer structure. When the sheet 30 has the single layer structure, the one layer is a fixing layer to which the wire-like transmission member 20 is fixed. The sheet 30 may be a resin sheet. For example, the sheet 30 may be formed of resin such as polyvinyl chloride (PVC), polyethylene (PE), polypropylene (PP), or polyethylene terephthalate (PET). The sheet 30 may be a sheet having an evenly filled cross-sectional surface (also referred to as a non-foam sheet or a solid sheet, for example). The sheet 30 is also considered a fibrous material such as a braided cloth, a woven cloth, or a non-woven cloth, for example. The sheet 30 is also considered a foam sheet, for example. The sheet 30 may be a metal sheet.

The sheet 30 may also have a multilayer structure. When the sheet 30 has the multilayer structure, various types of sheet described in the single layer structure described above is adopted to the sheet constituting the fixing layer. Various types of sheet described in the single layer structure described above and a sheet which is not suited for fixation of the wire-like transmission member 20 may be adopted to the sheet which does not constitute the fixing layer. The sheet 30 includes a first layer and a second layer stacked on each other, for example.

The first layer is a fixing layer. Any layer is not particularly limited but can be used as the first layer as long as it can fix the wire-like transmission member 20 to the sheet 30. For example, the first layer may also be a resin layer evenly filled with resin and having an evenly filled cross-sectional surface. The wire-like transmission member 20 is fixed by the first layer. Resin as a material of the first layer is the same as that of the covering layer, for example. One surface of the first layer is one main surface of the sheet 30.

The second layer is a layer for adding or reinforcing a function such as protection. For example, the second layer is a fibrous material layer. One surface of the second layer is the other main surface of the sheet 30. The first layer and the second layer are fixed by adhesion or fusion, for example.

The sheet 30 may be a flexible member. For example, the first layer is a resin layer having an evenly filled cross-sectional surface made up of flexible resin such as soft PVC as a material, the second layer is a non-woven cloth made up of PET as a material, and the sheet 30 is a flexible member. For example, the sheet 30 may have a plastic property so as to be able to follow bending of the wire-like transmission member 20. That is to say, it is also applicable that the wiring member 10 can be bended in a thickness direction (bending so that a fold line follows the main surface of the sheet 30). The sheet 30 may have rigidity to an extent of being able to maintain a planar surface in a state where the wiring member 10 is raised.

Each of the plurality of wire-like transmission members 20 is fixed to the sheet 30 at a plurality of positions at intervals along the longitudinal direction. Each of the plurality of wire-like transmission members 20 may be wholly fixed to the sheet 30 continuously along the longitudinal direction.

The wiring member 10 is provided with route bending portions 12 and 14. The route bending portions 12 and 14 are parts of the wiring member 10. The route bending portions 12 and 14 are portions in which the wire-like transmission member 20 is beaded and disposed on the sheet 30. Each of the route bending portions 12 and 14 includes a bending position FT.

Figure 4:
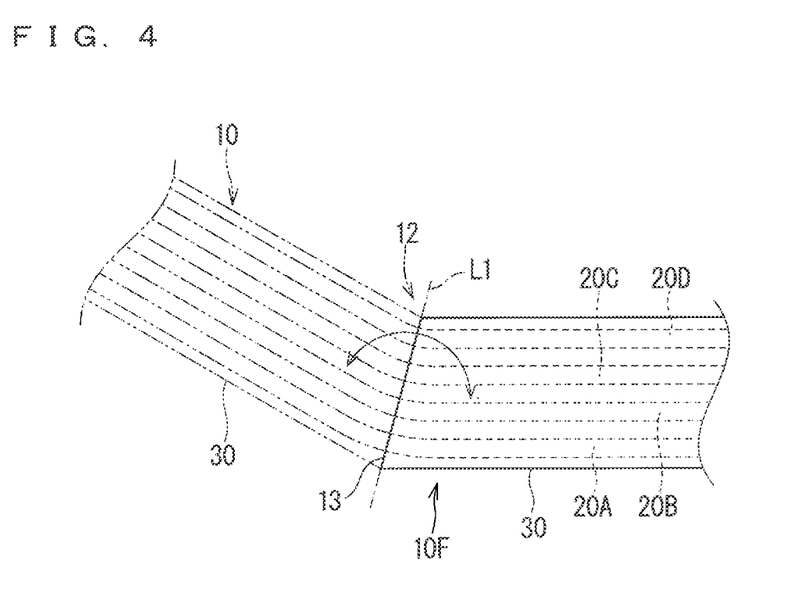
FIG. 4 is an explanation diagram illustrating a portion bended in the region A1 in the wiring member.

The route bending portions 12 and 14 in the wiring member 10 are bended at a portion of a bending reference line L1 as illustrated in FIG. 2, for example. The bending reference line L1 is a virtual line made by extending a fold line CR described hereinafter. The wiring member 10F in which the route bending portions 12 and 14 are beaded enters a folded state as illustrated in FIG. 4 in some cases. For example, a packing form at a time of transporting the wiring member 10 is the wiring member 10F in a folding form. The bending position FT is a trace left in a portion bended in the wiring member 10 when the wiring member 10F in the folding form is developed to be the wiring member 10 at a time of being assembled to a vehicle, for example. The bending position FT indicates a position where the wiring member is bended, and can be considered as a bending trace, for example. Examples of the bending trace include a case where a crease remains in the wire-like transmission member 20. The bending position FT is not limited to the bending trace but can also be considered a position bended as a package, for example.

The bending trace is formed in at least one of the sheet 30 and the wire-like transmission member 20 in the state where the wiring member 10 is developed.

Considered as a case where the bending trace is form d in the sheet 30 are a ease where the sheet 30 is hard to an extent that the bending trace can be formed and a case where a bending portion is pressed, for example. Considered as a case where the bending trace is not formed in the sheet 30 are a case where the sheet 30 is soft and a case where bending is gradual (for example, a case where bending is performed so that the wire-like transmission member 20 is located on an inner side and the sheet 30 is located on an outer side), for example.

A case where the bending trace is formed in the wire-like transmission member 20 includes a case the bending trace is formed in the transmission wire body or a covering layer. Considered as a case where the bending trace is formed in the covering layer are a case where the covering layer is hard to an extent that the bending trace can be formed and a case where a bending portion is pressed, for example. Considered as a case where the bending trace is not formed in the covering layer are a case where the covering layer is soft and a ease where bending is gradual (for example, a case where bending is performed so that the sheet 30 is located on an inner side and the wire-like transmission member 20 is located on an outer side), for example.

Bending on the route bending portions 12 and 14 may be inflection or curvature. When the bending on the route bending portions 12 and 14 is inflection, the bending position FT is located in a portion of each of the route bending portions 12 and 14 corresponding to an inflection point of the wire-like transmission member. When the bending on the route bending portions 12 and 14 is curvature, the bending position FT may be located in a portion of each of the route bending portions 12 and 14 corresponding to any position in a curve section in the wire-like transmission member 20.

The route bending portion 12 is provided in the region A1 in FIG. 1 herein. The route bending portion 14 is provided in the region A2 in FIG. 1. Each of the route bending portions 12 and 14 includes the bending position FT. The regions A1 and A2 are described in detail hereinafter.

<Region A1>

Figure 3:
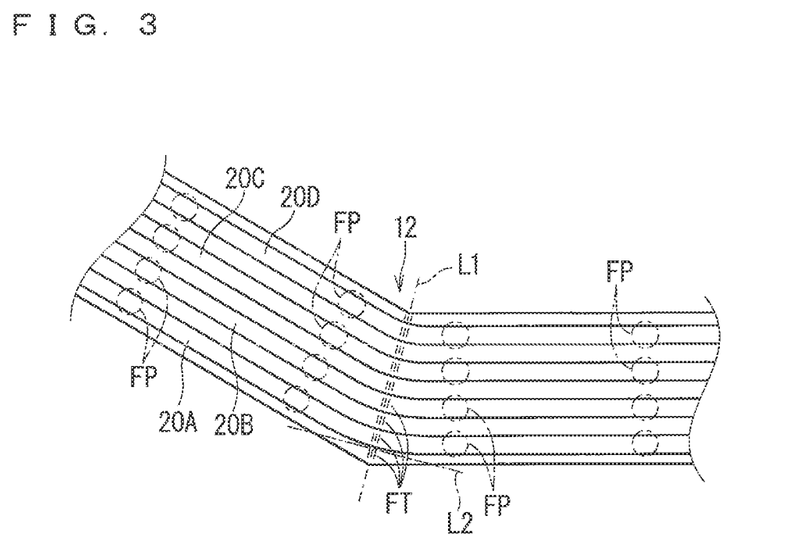
FIG. 3 is an enlarged view of a region A1 in FIG. 1.
Figure 5:
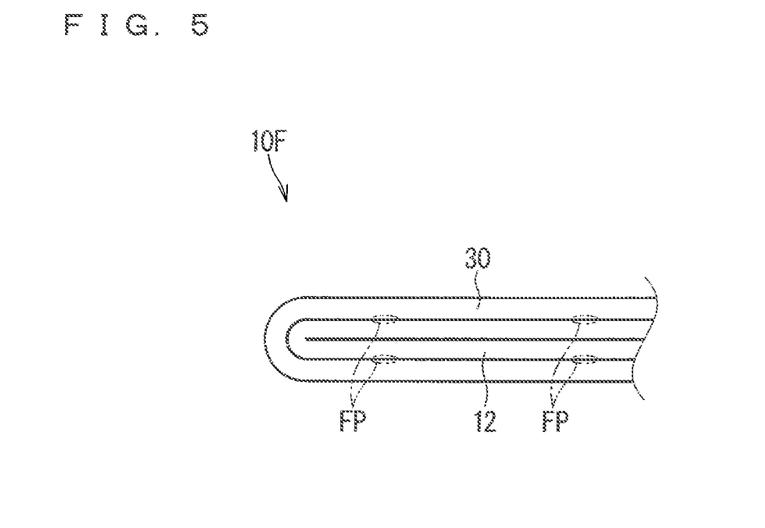
FIG. 5 is a side view illustrating a portion in the region A1 in the wiring member in a bended state.

FIG. 3 is an enlarged view of the region A1 in FIG. 1. FIG. 4 is an explanation diagram illustrating a portion bended in the region A1 in the wiring member 10. FIG. 5 is a side view illustrating a portion in the region A1 in the wiring member 10F in a bended state.

The route bending portion 12 in the region A1 is the same route bending portion 12, The same route bending portion 12 is a portion where all of the wire-like transmission members 20 in the route bending portion 12 parallelly extend along the same route. In the example illustrated in FIG. 3, the same route bending portion 12 is provided between two straight route portions. The straight route portion is a portion where all of the plurality of wire-like transmission members 20 in the straight route portion extend straight. A direction in which the wire-like transmission member 20 extends in a first straight route portion and a direction in which the wire-like transmission member 20 extends in a second straight route portion in the two straight route portions are different from each other. Herein, the wire-like transmission member 20 is disposed in a bended form other than a U-turn like shape on a planar surface in the same route bending portion 12. Accordingly, the direction in which the wire-like transmission member 20 extends in the first straight route portion and the direction in which the wire-like transmission member 20 extends in the second straight route portion intersect with each other.

Herein, an angle between the first and second straight route portions is 30 degrees. As described above, the angle between the first and second straight route portions may be any angle ranging from 0 to 90 degrees. The angle between the first and second straight route portions may be 90 degrees or any angle ranging from 90 to 180 degrees.

The wire-like transmission member 20 may be disposed to take a U-turn route on a planar surface in the same route bending portion 12. In this case, the direction in which the wire-like transmission member 20 extends in the first straight route portion and the direction in which the wire-like transmission member 20 extends in the second straight route portion are parallel to each other. Even in this case, the first straight route portion and the second straight route portion deviate from each other, and do not coincide with each other. Thus, the direction in which the wire-like transmission member 20 extends in the first straight route portion and the direction in which the wire-like transmission member 20 extends in the second straight route portion are considered to be different from each other.

The sheet 30 is also formed into a bended shape along the route of the wire-like transmission member 20 in the same route bending portion 12. However, the sheet 30 may not be formed into a bended shape along the route of the wire-like transmission member 20 in the same route bending portion 12. For example, the sheet 30 may be formed straight and have a large width so that the wire-like transmission member 20 can be disposed therein in a bended form.

The same route bending portion 12 includes the bending position FT. Herein, the same route bending portion 12 is provided in a portion where four wire-like transmission members 20A, 20B, 20C, and 20D are parallelly disposed. A bending trace is formed in each of the four wire-like transmission members 20A, 20B, 20C, and 20D. A bending trace is formed in a lateral side of each of the four wire-like transmission members 20A, 20B, 20C, and 20D in the sheet 30.

The wire-like transmission member 20 is bended only once in the same route bending portion 12. The wire-like transmission member 20 may be bended plural times in the same route bending portion 12. In this case, a bending portion in which the wire-like transmission member 20 is bended so that one side in a width direction (parallel direction) is located inward and a bending portion in which the wire-like transmission member 20 is bended so that the other side in the width direction (parallel direction) is located inward are alternately disposed in the same route bending portion 12.

<Region A2>

Figure 6:
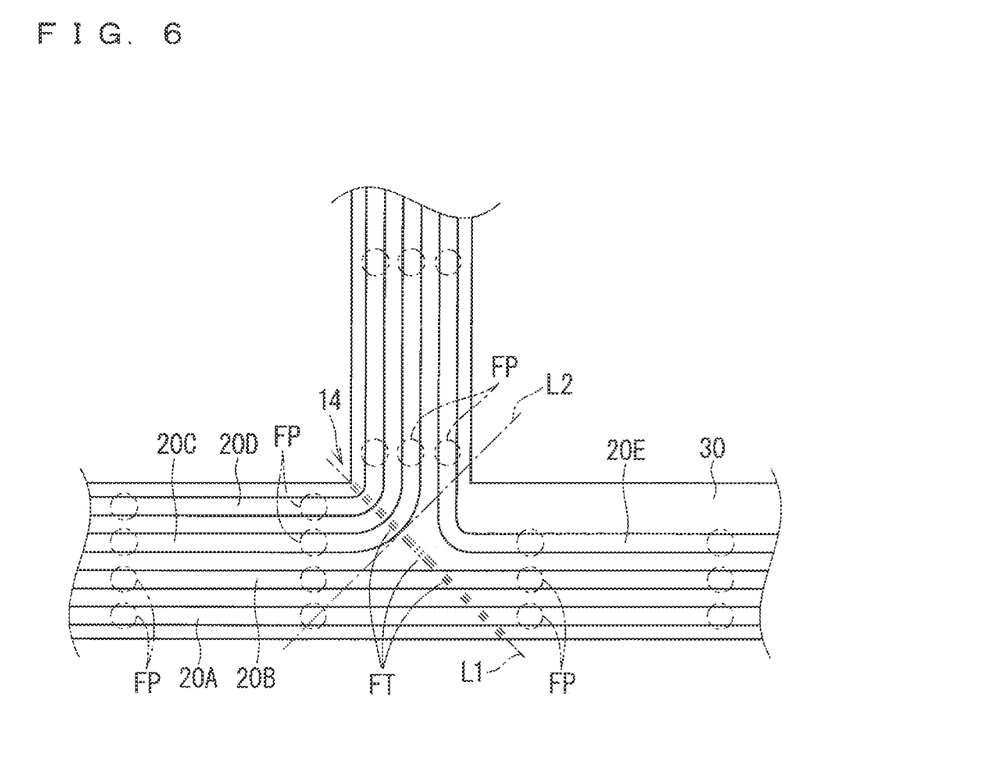
FIG. 6 is an enlarged view of a region A2 in FIG. 1.
Figure 7:
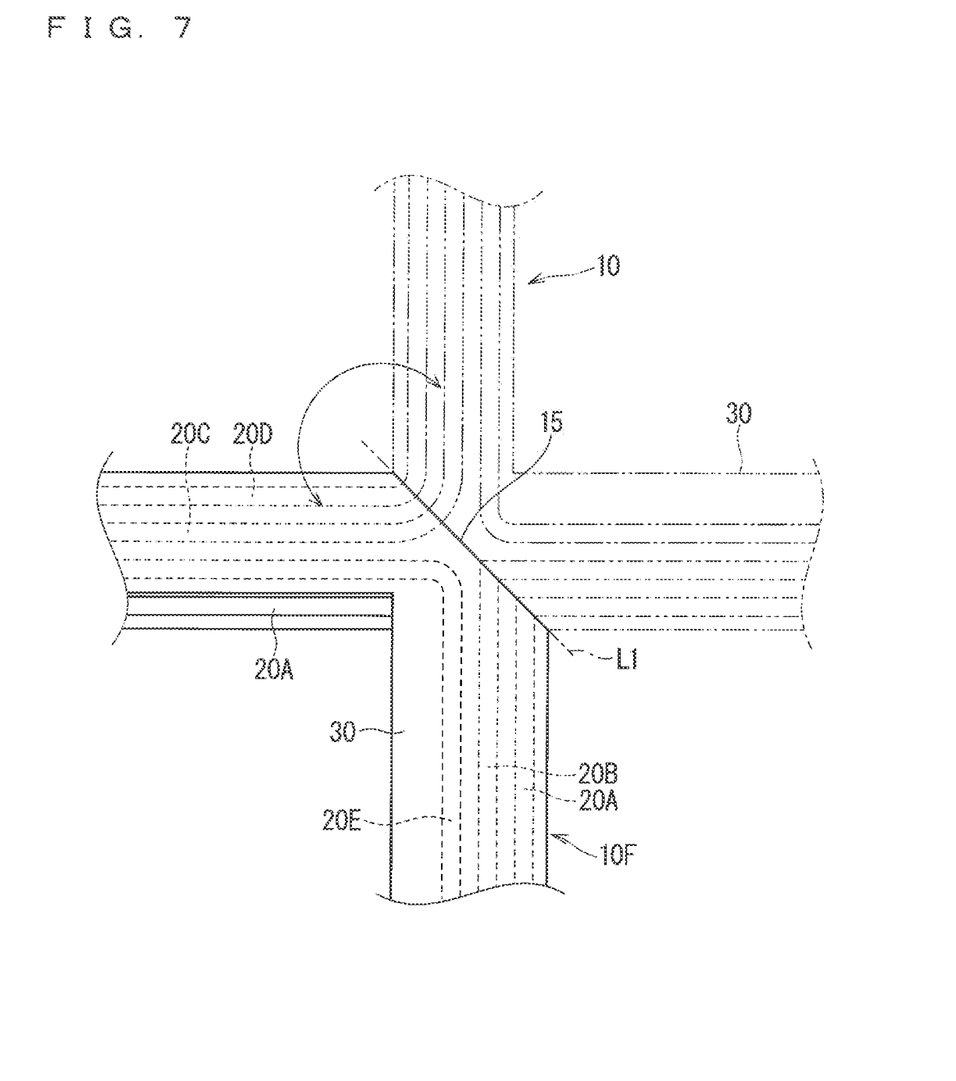
FIG. 7 is an explanation diagram illustrating a portion bended in the region A2 in the wiring member.

FIG. 6 is an enlarged view of the region A2 in FIG. 7 is an explanation diagram illustrating a portion bended in the region A2 in the wiring member 10.

The route bending portion 14 in the region A2 is the branch route bending portion 14. The branch route bending portion 14 is a portion where some of the wire-like transmission members 20 in the plurality of wire-like transmission members 20 are branched from the other some of the wire-like transmission members 20. In the example illustrated in FIG. 6, a portion where a branch wire is branched from a main wire in the plurality of wire-like transmission members 20 is the branch route bending portion 14. Herein, the main wire extends straight, however, the main wire may be bended. Herein, the branch wire extends in a direction perpendicular to the main wire, however, the branch wire may extend in a direction other than the perpendicular direction. Herein, only one branch wire is branched from one branch portion, however, the plurality of branch wires may be branched from one branch portion.

Specifically, the two wire-like transmission members 20A and 20B constitute the whole main wire from one end portion to the other end portion. The three wire-like transmission members 20C, 20D, and 20E constitute the main wire in a section from one end portion to the branch portion, and constitute the branch wire in a section from the branch portion to the other end portion. A portion of the three wire-like transmission members 20C, 20D, and 20E constituting the branch wire parallelly extends. A portion of the two wire-like transmission members 20C and 20D constituting the main wire and a portion of one wire-like transmission member 20E constituting the main wire mutually extend in an opposite direction from the branch portion.

The sheet 30 is also formed into a branched shape along the route of the wire-like transmission member 20 in the branch route bending portion 14. However, the sheet 30 may not be formed into a branched shape along the route of the wire-like transmission member 20 in the branch route bending portion 14. For example, the sheet 30 may be formed straight and have a large width so as to be able to fix the main wire and the branch wire. For example, it is also applicable that the sheet 30 is formed straight, can fix the main wire and the branch portion, but does not fix the branch wire.

The branch route bending portion 14 includes the bending position FT. In the branch route bending portion 14, the three wire-like transmission members 20C, 20D, and 20E are disposed in a bended form. A bending trace is formed in each of the two wire-like transmission members 20C and 20D in the three wire-like transmission members 20C, 20D, and 20E. Herein, when the two wire-like transmission members 20C and 20D are bended, the two wire-like transmission members 20A and 20B also need to be bended. Thus, a bending trace is also formed in each of the two wire-like transmission members 20A and 20B. A bending trace is formed in a lateral side of each of the four wire-like transmission members 20A, 20B, 20C, and 20D in the sheet 30.

In FIG. 3, FIG. 5, and FIG. 6, fixing positions FP where the wire-like transmission members 20 and the sheet 30 are fixed are indicated by dashed-two dotted lines. The wire-like transmission members 20 are fixed to the sheet 30 at the plurality of fixing positions FP at intervals along the longitudinal direction also in the route bending portions 12 and 14. The bending position FT is located between the plurality of fixing positions FP. Accordingly, as illustrated in FIG. 6, the wiring member 10 is folded in a portion where the wire-like transmission member 20 and the sheet 30 are not fixed to each other.

The fold line CR can be recognized from the bending trace in the wiring member 10. For example, when a bending trace formed in any one of the members has a linear shape, a line thereof is recognized as the fold line CR. For example, when bending traces are formed in a plurality of members and the bending traces of the plurality of members are arranged in a row, a virtual line connecting the bending traces of the plurality of members is recognized as the fold line CR.

The fold line CR extends in a direction perpendicular to a tangential direction of the wire-like transmission member 20 in the route bending portions 12 and 14. In FIG. 3 and FIG. 6, a virtual line L2 is a line following a tangential direction in a portion where the bending trace of the wire-like transmission member 20 is formed. The fold line CR is perpendicular to the virtual line L2. When the plurality of wire-like transmission members 20 are provided in the route bending portions 12 and 14, the fold line CR extends in a direction perpendicular to the tangential direction of all of the wire-like transmission members 20 in the route bending portions 12 and 14. Herein, centers of curvature of the plurality of wire-like transmission members 20 in the route bending portions 12 and 14 coincide with each other. Accordingly, a curvature radius of the wire-like transmission member 20 on an outer peripheral side is larger than a curvature radius of the wire-like transmission member 20 on an inner peripheral side. The fold line CR extends in a radius direction with respect to a center of curvature, thus the fold line CR extends to a direction perpendicular to the tangential direction of all of the wire-like transmission members 20 in the route bending portions 12 and 14.

However, centers of curvature of the plurality of wire-like transmission members 20 in the route bending portions 12 and 14 need not coincide with each other. For example, the curvature radius of the plurality of wire-like transmission members 20 in the route bending portions 12 and 14 may coincide with each other. In this case, when the centers of curvature of the plurality of wire-like transmission members 20 in the route bending portions 12 and 14 are arranged in a row, and the fold line CR is formed in a direction in which the centers of curvature are arranged, the fold line CR extends in a direction perpendicular to the tangential direction of all of the wire-like transmission members 20 in the route bending portions 12 and 14.

Folding positions 13 and 15 are located in the route bending portions 12 and 14 in the wiring member 10 in the folded state described above, that is to say, in the wiring member 10F (refer to FIG. 2). When this wiring member 10F is developed, the bending traces as the traces of the folding positions 13 and 15 are located in the route bending portions 12 and 14 (refer to FIG. 1). The bending traces are observed as traces left as creases in the wire-like transmission member 20 or traces left as creases in the sheet 30.

<Effect Etc.>

According to the wiring member 10 having the configuration described above, each of the route bending portions 12 and 14 includes the bending position FT, thus the route bending portions 12 and 14 are bended in the wiring member 10. Accordingly, suppressed is strong force on the wire-like transmission member 20. A plurality of actions are considered as this action, and first and second actions described hereinafter are considered as examples. Third and fourth actions described hereinafter are also considered as examples of the other actions.

Firstly, when the route bending portions 12 and 14 are bended in the wiring member 10, the fold line CR tends to extend obliquely with respect to the wire-like transmission member 20. Accordingly, a region to which force is applied at the time of bending (a region with the bending trace) increases in the circumferential direction of the wire-like transmission member 20. Accordingly, force is diffused, and strong force is hardly applied.

Secondly, compression occurs in a portion on an inner side of the wire-like transmission member 20 at the time of bending, and extension occurs in a portion on an outer side. When a ratio of this route difference is large, strong force is considered to be easily applied. When the route bending portions 12 and 14 are bended, a route difference between a route of a compressed portion and a route of an extended portion is small in ratio compared with a case where a portion of the wiring member 10 where the wire-like transmission member 20 is linearly disposed is bended, and strong force is hardly applied to the wire-like transmission member 20.

Thirdly, in the route bending portion 12, the route bending portion 12 already has the compressed portion and the extended portion extending to the route bending portion 12 before the wiring member 10 is folded. The compressed portion and the extended portions extending to the route bending portion 12 are located to deviate from each other by 180 degrees in the circumferential direction of the wire-like transmission member 20. The wiring member 10 is bended in a direction different from that of bending of the route bending portion 12. The compressed portion and the extended portions caused by bending of the wiring member 10 are located to deviate from each other by 180 degrees in the circumferential direction of the wire-like transmission member 20. When the wiring member 10 is bended in the thickness direction, the compressed portion (extended portion) extending to the route bending portion 12 and the compressed portion (extended portion) caused by bending the wiring member 10 are located to deviate from each other by 90 degrees in the circumferential direction of the wire-like transmission member 20. Thus, the compressed portion extending to the route bending portion 12 is used for the extended portion caused by bending the wiring member 10, and the extended portion extending to the route bending portion 12 is used for the compressed portion caused by bending the wiring member 10, thus stress on the wire-like transmission member 20 in bending the wiring member 10 is reduced. The similar action occurs also in the route bending portion 14.

Fourthly, the bending position FT is located between the plurality of fixing positions FP. A portion between the fixing positions FP in the wire-like transmission member 20 can be moved relatively freely compared with a portion fixed to the sheet 30. Accordingly, stress is easily diffused at a time of bending the wiring member 10, and strong force on the wire-like transmission member 20 is suppressed.

The same route bending portion 12 includes the bending position FT, thus the wiring member 10 is bended at the same route bending portion 12. The branch route bending portion 14 includes the bending position FT, thus the wiring member 10 is bended at the branch route bending portion 14.

The fold line CR extends in the direction perpendicular to the tangential direction of the wire-like transmission member 20 in the route bending portions 12 and 14, thus three caused by bending hardly acts as force in a direction following the main surface of the sheet 30. Accordingly, fixation of the sheet 30 and the wire-like transmission member 20 is hardly resolved. When the fold line CR extends in the direction perpendicular to the tangential direction of the wire-like transmission member 20 in the route bending portions 12 and 14, the first action described above is considered to hardly occur.

The wiring member 10 is bended at a time of package and transportation, for example, to reduce a size thereof in this regard, the wiring member 10 is beaded at the route bending portions 12 and 14 in the wiring member 10 having the route bending portions 12 and 14, thus the wiring member 10F can be further reduced in size.

Embodiment 2

Figure 8:
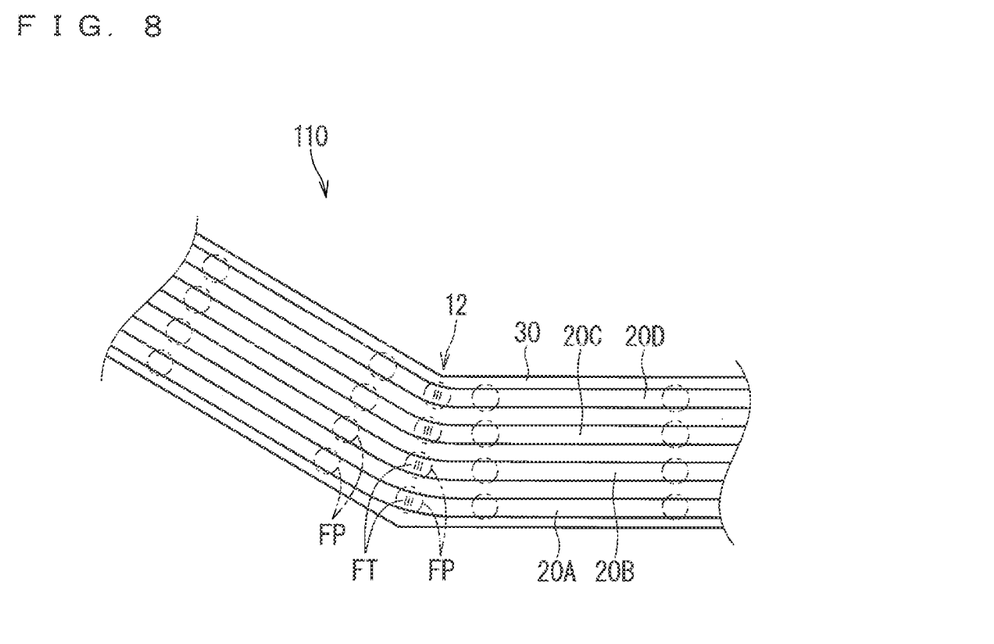
FIG. 8 is a schematic plan view illustrating a wiring member according to an embodiment 2.

A wiring member according to an embodiment 2 is described. FIG. 8 is a schematic plan view illustrating a wiring member 110 according to the embodiment 2. In the following description of the present embodiment, the same reference numerals are assigned to the similar constituent elements described above, and the description thereof will be omitted.

The wiring member 110 is different from the wiring member 10 in that the bending position FT is located in a portion where the wire-like transmission member 20 is fixed to the sheet 30. An example in the same route bending portion 12 is described herein, however, a configuration described in the present embodiment may be applied to the other route bending portion 14.

The wire-like transmission members 20 are fixed to the sheet 30 at the plurality of fixing positions FP at intervals along the longitudinal direction. One of the plurality of fixing positions FP is located in the bending position FT. In the configuration that the wiring member 110 is folded, the wire-like transmission member 20 in the route bending portion 12 is folded in a portion fixed to the sheet 30. Herein, the wire-like transmission member 20 is folded in a portion where one of the plurality of fixing positions FP is located in the route bending portion 12.

According to such a wiring member 110, the bending position FT is located in a portion where the wire-like transmission member 20 is fixed to the sheet 30, thus the wire-like transmission member 20 is hardly separated from the sheet 30 at the time of bending the wiring member 110. Accordingly, an operation of bending the wiring member 110 is easily performed.

Furthermore, the wiring member 110 is folded in a direction different from that of bending of the route bending portion 12, thus when the route bending portion 12 is folded, a component following the main surface of the sheet 30 occurs as a component of force at the time of folding the route bending portion 12, and acts as force of separating the wire-like transmission member 20 from the sheet 30. Accordingly, when force on the wire-like transmission member 20 at the time of folding the route bending portion 12 is increased, the wire-like transmission member 20 is separated from the sheet 30. The wire-like transmission member 20 can be moved freely after being separated from the sheet 30, thus strong force is hardly applied to the wire-like transmission member 20.

The wire-like transmission members 20 are fixed to the sheet 30 at the plurality of fixing positions FP at intervals along the longitudinal direction, and one of the plurality of fixing positions FP is located in the bending position FT, thus the bending position FT is disposed in one of the plurality of fixing positions FP.

Embodiment 3

Figure 9:
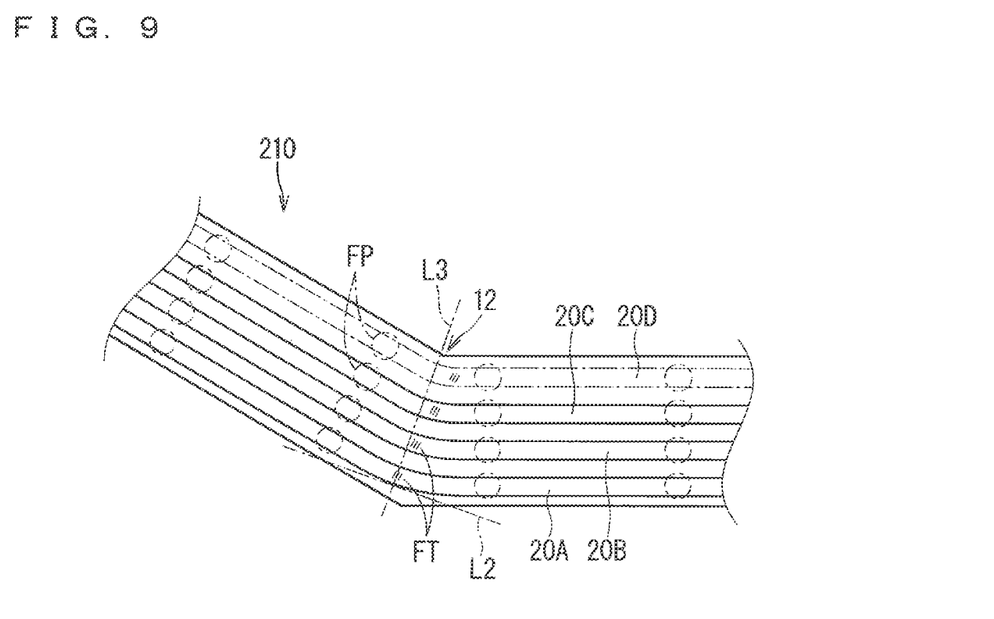
FIG. 9 is a schematic plan view illustrating a wiring member according to an embodiment 3.
Figure 10:
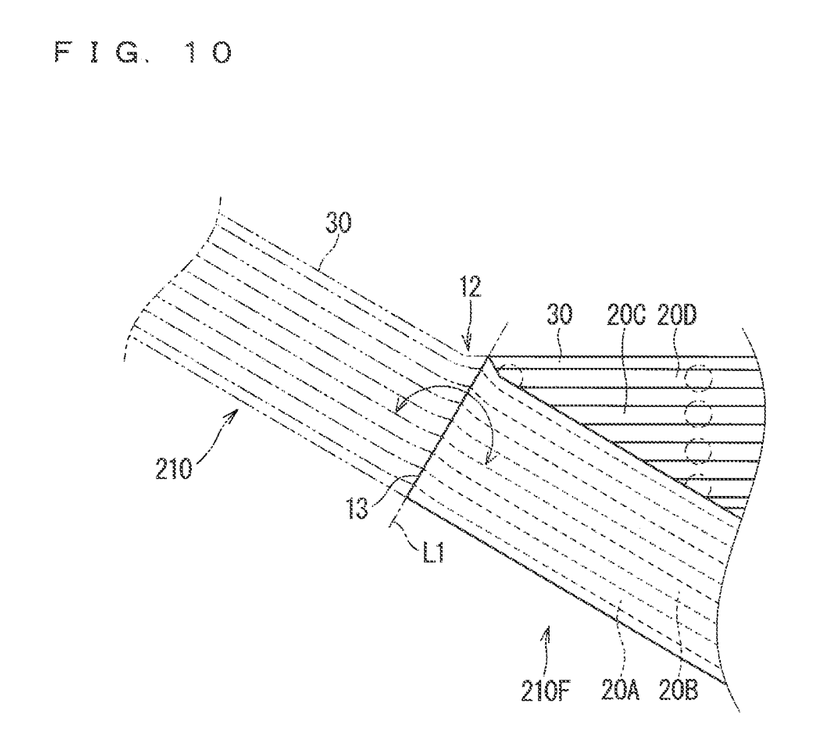
FIG. 10 is a schematic plan view illustrating bended wiring member.

A wiring member according to an embodiment 3 is described. FIG. 9 is a schematic plan view illustrating a wiring member 210 according to the embodiment 3. FIG. 10 is a schematic plan view illustrating the bended wiring member 210F. In the following description of the present embodiment, the same reference numerals are assigned to the similar constituent elements described above, and the description thereof will be omitted.

The wiring member 210 is different from the wiring member 10 described above in that the told line CR extends in a direction intersecting with the tangential direction of the wire-like transmission member 20 in the route bending portions 12 and 14 at an angle other than the right angle. An example in the same route bending portion 12 is described herein, however, a configuration described in the present embodiment may be applied to the other route bending portion 14. When the plurality of wire-like transmission members 20 are provided in the route bending portion 12, the fold line CR may extend in a direction intersecting with the tangential direction of at least one wire-like transmission member 20 in the route bending portion 12 at an angle other than the right angle.

Specifically, In FIG. 9, the virtual line L2 is a line following a tangential direction in a portion where a bending trace of the wire-like transmission member 20 is formed. In FIG. 9, a virtual line L3 is a line following a direction perpendicular to a tangential direction in a portion where a bending trace of the wire-like transmission member 20 is formed. Accordingly, virtual line L2 and the virtual line L3 are perpendicular to each other. The fold line CR extends in a direction intersecting with both the virtual lines L2 and L3.

According to such a wiring member 210, the fold line CR extends in a direction intersecting with the tangential direction of the wire-like transmission member 20 in the route bending portion 12 at an angle other than the right angle, thus the first action described above easily occurs. That is to say, a region for bending (a region with the bending trace) in the wire-like transmission member 20 is increased, and strong force is hardly applied to the wire-like transmission member 20.

[Additional Statement]

A wiring member in which the route bending portions 12 and 14 are folded such as the wiring members 10F and 210F in the folded state may also be considered as the wiring member according to the present disclosure. The wiring member in which the route bending portions 12 and 14 are folded is a wiring member in which the route bending portions 12 and 14 are folded in the thickness direction of the sheet 30. That is to say, the wiring member may be a wiring member including the wire-like transmission member 20 and the sheet 30 to which the wire-like transmission member 20 is fixed, the route bending portions 12 and 14 in which the wire-like transmission member 20 is bended and disposed are provided on the sheet 30, and the route bending portions 12 14 are folded.

Such a wiring member may have a packing form or a form disposed in a vehicle. Also according to such a wiring member, the route bending portions 12 and 14 are folded, thus strong force is hardly applied to the wire-like transmission member 20 by the first to fourth actions described above, for example.

Modification Example

In the description in the embodiment 1, each of the route bending portions 12 and 14 includes the bending position FT, and the wiring member 10 includes the two bending positions FT, however, this configuration is not necessary. The wiring member 10 may include only one bending position FT, or may also include three or more bending positions FT.

In the description, only the route bending portions 12 and 14 include the bending position FT, however, this configuration is not necessary. A portion other than the branch route bending portions 12 and 14 may include the bending position FT. For example, a straight route portion may include the bending position FT. The route bending portions 12 and 14 may include at least one bending position FT.

When the plurality of route bending portions 12 and 14 are provided in the wiring member 10, all of the plurality of route bending portions 12 and 14 may include the bending position FT. Only some of the route bending portions 12 and 14 in the plurality of route bending portions 12 and 14 may include the bending position FT. That is to say, the route bending portions 12 and 14 with no bending position FT are also applicable.

The configurations described in the embodiments and modification examples thereof can be appropriately combined as long as they are not contradictory.

EXPLANATION OF REFERENCE SIGNS 10, 110, 210 wiring member
10F, 210F wiring member (folded state)
12 same route bending portion (route bending portion)
13 folding position
14 branch route bending portion (route bending portion)
15 folding position
20 wire-like transmission member
30 sheet
C connector
FT bending position
FP fixing position
CR fold line

The invention claimed is:
1. A wiring member, comprising:
at least one wire-like transmission member; and
a sheet to which the wire-like transmission member is fixed, wherein
a route bending portion in which the wire-like transmission member is bended and disposed is provided on the sheet,
the route bending portion includes a bending position,
the bending position is formed in a portion where the wire-like transmission member is fixed to the sheet,
the wire-like transmission member is fixed to the sheet at a plurality of fixing positions at intervals along a longitudinal direction, and
one of the plurality of fixing positions is located in a portion where the bending position is formed.
2. The wiring member according to claim 1, wherein
the route bending portion includes a same route bending portion in which the at least one wire-like transmission member in the route bending portion extends along an identical route, and
the same route bending portion includes a bending position.

3. The wiring member according to claim 1, wherein
the at least one wire-like transmission member comprises
at least a first group of wire-like transmission member
and a second group of wire-like transmission member,
the route bending portion includes a branch route bending portion in which the first group of the at least one wire-like transmission member is branched from the second group of the at least one wire-like transmission member, and
the branch route bending portion includes a bending position.

4. The wiring member according to claim 1, wherein
the bending position is formed between the plurality of fixing positions.

5. The wiring member according to claim 1, wherein
a fold line which can be recognized from the bending position extends in a direction perpendicular to a tangential direction of the wire-like transmission member in the route bending portion.

6. The wiring member according to claim 1, wherein
a fold line which can be recognized from the bending position extends in a direction intersecting with a tangential direction of the wire-like transmission member in the route bending portion at an angle other than a right angle.

* * * * *